United States Patent Office 3,416,069
Patented Dec. 10, 1968

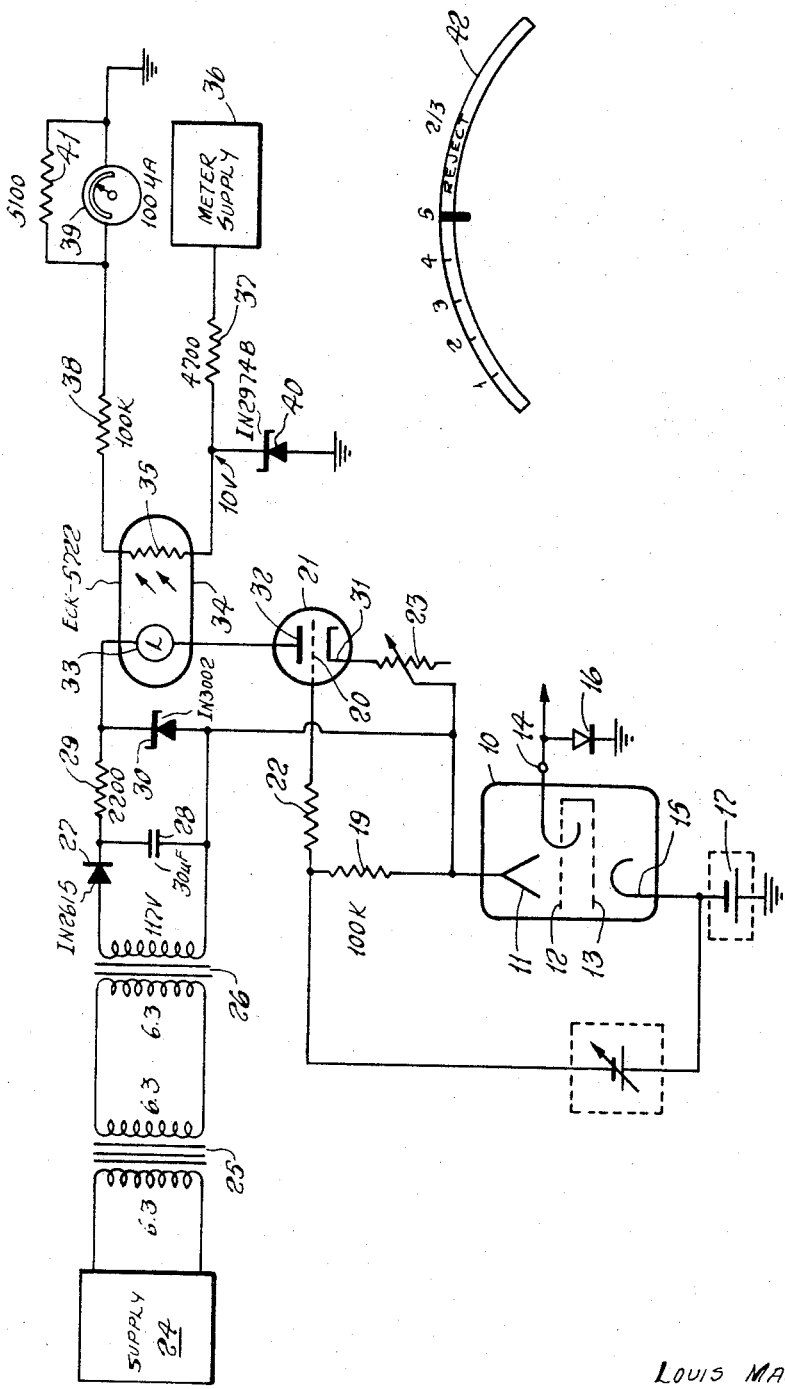

3,416,069
MEASUREMENT OF KLYSTRON
REFLECTOR CURRENT
Louis Mandel, Levittown, N.Y., assignor to the United States of America as represented by the Secretary of the Navy
Filed Feb. 21, 1966, Ser. No. 531,014
7 Claims. (Cl. 324—24)

ABSTRACT OF THE DISCLOSURE

A device for measuring the reflector current of a velocity modulated tube which includes a resistor in series with the reflector electrode and connected to the grid of a triode. The output of the triode is applied to the input of an opto-electronic means for providing an output proportional to the low amplitude reflector current and decoupled therefrom.

---

The invention described herein may be manufactured and used by or for the Government of the United States of America for governmental purposes without the payment of any royalties thereon or therefor.

This invention generally relates to the measurement of extremely small currents existing at very high potentials and in particular, to the measurement of reflector or repeller currents of a high potential velocity modulated device such as a klystron.

The reflector current of a typical klystron consists essentially in the sum of the gas current and the element or electrode leakage current. This current is of an extremely minute proportion, generally, about five microamperes. Measurements of such small currents are presently accomplished with the use of sensitive microammeters installed in series with the line carrying the current. Relative to klystrons, the reflector current can be accurately measured with an electronic microammeter, but, since the reflector electrode thereof is operated at high potentials, a highly sensitive direct reading type microammeter is necessary. This technique presents two distinct disadvantages, namely, the possibility of an overload causing damage to the expensive microammeter and the requirement to provide extensive insulation of the meter due to the high voltages.

Other techniques are presently available to accomplish the above measurements but the equipment is both large and expensive in addition to necessitating its operation by a skilled technician.

In view of the foregoing, it is an object of this invention to provide a simple, reliable, accurate and inexpensive device capable of measuring small currents at high potentials without presenting any danger to the operator thereof, nor necessitating skilled personnel.

Another object of this invention is to provide a measuring device for small currents at high voltages, which device employs a relatively inexpensive meter which is at approximately ground potential.

Other objects and advantages will appear from the following description of an example of the invention, and the novel features will be particularly pointed out in the appended claims.

The single accompanying drawing is a schematic diagram of an embodiment made in accordance with the principle of this invention.

In the illustrated embodiment, the reflector current of klystron 10 is to be measured. The klystron tube has a reflector electrode 11, a pair of buncher electrodes 12 and 13 coupled to an output terminal 14, and a beam or cathode electrode 15. These tubes being quite conventional, no detailed description thereof is necessary except to state that the output thereof is detected by rectifier 16 and then applied to the subsequent standard circuitry. The beam supply is generally indicated at 17 and provides a potential range from —4 kv. to about —200 volts while the reflector supply 18 provides a range extending from 0 down to —1 kv. Under these conditions the total voltage drop available can extend beyond to capabilities of low current sensitive ammeters.

Resistor 19 usually of a high value is inserted in the reflector supply and upon the occurrence of reflector current a small voltage drop will develop thereacross. As for example, if five microamperes or reflector current should flow, which is generally the maximum limit of an acceptable klystron tube, the drop across sampling resistor 19 will be approximately 0.5 volt. This small voltage has no effect on the tubes operation since it constitutes only a negligible proportion of the total available reflector potential. This small voltage is, however, a direct function of the reflector current.

The (reflector current) voltage across resistor 19 is applied to the grid 20 of triode control tube 21 via grid coupling resistor 22. This grid resistor limits the grid current in order to protect the tube 21. A variable cathode bias resistor 23 is provided in order to control and set the operating point or parameters of tube 21. This control circuit is designed to saturate if too high reflector currents are present in order to protect both the control and subsequent metering circuits.

A highly stable power supply is provided for the control tube and consists initially of a regulated source of low voltage 24, such as 6.3 v., which may be obtained from the klystron low voltage supply (not shown). Transformer (1:1) 25 provides at least 5 kv. insulation and isolation. The second transformer raises the potential from the primary to the secondary to approximately 117 volts and has an isolation of at least 2.5 kv. Several high voltage insulated transformers are employed so as to prevent any leakage to ground of the high reflector voltage. The output of transformer 26 is rectified by diode 27 in conjunction with capacitor 28 and applied across load resistor 29. Zener diode 30 serves to regulate the supply and the voltage (75 v.) is applied across the cathode 31 via resistor 23 and the plate 32 of control tube 21 through the light bulb or source 33 of opto-electronic element 34.

The opto-electronic element 34 generally consists of a light source and a photo-sensitive resistive element disposed proximate each other and confined within a light tight structure. The light sources employed are either of the incandescent or gas discharge type. Each has associated therewith a distinct advantage. The filament or incandescent type is capable of operating at a relatively low voltage but exhibits a high degree of inertia and thus much slower in its response. The ionized gas type is capable of an extremely short response time while requiring a higher control voltage. The photo-resistive materials are semiconductors having a polycrystalline structure and are generally of compounds such as cadmium sulphide, cadmium selenide or lead telluride, depending on the specific characteristics desired. The light impinging on the photocell causes the photoresistor to become more conductive and its resistance thus being a function of the light intensity or source energy. Thus, a variation of the supply or input to the light bulb alters the illumination incident on the photocell and changes its resistance. One such opto-electronic component satisfactorily employed herein is solid commercially by the Raytheon Company, Massachusetts under the U.S. registered trademark "Raysistor."

Merely for the purpose of illustration the "Raysistor"

employed to designated as an ECK-5722 and has the following characteristics:

Control voltage (lamp) _____ v. D.C. __ 0-17
Control current _____ ma ___ 0-17
"On" resistance _____ ohms __ 1200
"Off" resistance _____ megohms __ 200

The B voltage of 75 volts from the Zener diode 30 is applied between one terminal of the lamp 33 and the cathode bias resistor 23 with the cathode 31, plate 32 and the lamp 33 in a series combination. Since the reflector current of the klystron 10 is reflected or occur as a voltage drop across resistor 19 which is connected to the grid 20 of tube 21 then the presence of this small current will control the cathode-plate current of tube 21. This plate current changes the intensity or light output of the lamp 33 from its quiescent state and alters the resistance of the photoresistive element 35. Thus an increase of klystron reflector current increases the resistance of photocell 35 which is in series with a meter supply 36, a supply resistor 27, limiting resistor 38 and a microammeter 39. Zener diode 40 provides a regulated voltage for this series ohmmeter circuit.

The changes and state of the resistance of cell 35 are indicated by ammeter 39 and are related to the klystron reflector current. It should be observed that the voltage drop across the meter is small and relative to the klystron potentials this is approximately ground potential. Although the response of the photoresistor 35 is nonlinear, the response of the meter may be made linear for approximately one-half scale by shunting the meter with resistor 41. The meter scale 42 (which has been enlarged for clarity) is linear up to the indicia "5" marked thereon which by selecting the correct component values (shown on the figure) corresponds to 5 microamperes of klystron reflector current. This value was selected since reflector currents in excess thereof are indicative of unsatisfactory klystron tubes and rejected. The quantitative current value in excess of 5 microamperes is not important since the degree of rejection is not considered. The absolute reflector current value of acceptable tubes is, however, noteworthy and most useful. The circuit embodiment aforedescribed is complete in that it offers both quantitative and qualitative reflector currents in addition to accurately measuring extremely small currents at relative ground potentials in the presence of high potentials up to 25 kv. without introducing any hazard to the personnel operating the equipment.

It will be understood that various changes in the details, materials, and arrangements of parts (and steps), which have been herein described and illustrated in order to explain the nature of the invention, may be made by those skilled in the art within the principle and scope of the invention as expressed in the appended claims.

I claim:

1. A device for measuring extremely small reflector currents of a high voltage velocity modulated tube which comprises:
   a current sampling resistor connected in series with the reflector electrode of said velocity modulated tube,
   control means having a pair of electrodes and a control electrode wherein the potential of said control electrode controls the current flow between said pair of electrodes,
   a coupling means connected between said sampling resistor and said control electrode,
   an opto-electronic means having a pair of input terminals and a pair of output terminals electrically decoupled from said input terminals, wherein the resistance between said output terminals will be proportional to the current applied to said input terminals, and having said input terminals connected in series, with said pair of electrodes of said control means,
   a current circuit measuring means including a constant voltage source, said measuring means connected in series with said output terminals of said opto-electronic means,
   whereby the current flowing in said output terminals will be measured and proportional to said reflector current.

2. The device according to claim 1 wherein said opto-electronic means includes:
   a source of light whose intensity is proportional to the current flowing therethrough, connected between said input terminals,
   a photo-sensitive resistor spaced from out in the path of light emanating from said source of light,
   a light tight container having disposed therein said light source and said photo-sensitive resistor.

3. The device according to claim 2 wherein said control means is a vacuum tube having a cathode, plate and grid electrodes.

4. The device according to claim 3 wherein said coupling means is a resistor connected between said sampling resistor and said grid electrode.

5. The device according to claim 4 further including a Zener diode regulated power supply having a plurality of insulated transformers,
   a variable cathode bias resistor connected in series with said cathode electrode,
   said Zener regulated supply connected between said light source and said cathode resistor.

6. The device according to claim 5 wherein said current measuring means includes in series,
   a regulated low voltage source,
   an ammeter having
   a compensating resistor connected thereacross to compensate for the nonlinearity of said opto-electronic means and said control means,
   whereby coaction of said compensating resistor and said variable cathode bias resistor will compensate for the nonlinearity and provide a linear deflection on said ammeter.

7. The device according to claim 6 wherein said ammeter includes means for indicating thereon whether said reflector current exceeds some predetermined value and the scalar value thereof below this predetermined value.

References Cited

UNITED STATES PATENTS

| 2,699,528 | 1/1955 | Periale | 324—24 |
| 3,141,131 | 7/1964 | McCoy | 324—96 |

RUDOLPH V. ROLINEC, *Primary Examiner.*

C. F. ROBERTS, *Assistant Examiner.*

U.S. Cl. X.R.

324—96